Nov. 25, 1958      L. KADLEC      2,861,537

ILLUMINATED INSTRUMENT

Filed April 8, 1957

INVENTOR.
LADISLAV KADLEC
BY
Leonard H. King

United States Patent Office

2,861,537
Patented Nov. 25, 1958

---

2,861,537

ILLUMINATED INSTRUMENT

Ladislav Kadlec, New York, N. Y., assignor to Avien, Inc., Woodside, N. Y.

Application April 8, 1957, Serial No. 651,405

8 Claims. (Cl. 116—129)

---

The present invention, in general, relates to indirectly lighted indicating instruments and, more particularly, to an illuminated pointer for such instruments.

Under night flying conditions the cockpit of an aircraft is operated without any general illumination so that the pilot may retain "night-vision" or the ability to see into the outside darkness.

In spite of the low general illumination levels in the compartment, the instruments must be adequately illuminated so that the craft may be properly handled.

In many instruments, the direct rays of light from the source of illumination are employed to illuminate a pointer relative to a dial. Usually the light rays are directed across the face of the dail and as a result strike the dial to produce an undesirable glare.

An improvement recently introduced utilizes an illuminated indicating instrument wherein the back of a translucent stationary dial is illuminated. A common form of this type of dial utilizes a colorless transparent body formed of a synthetic resin material such as acrylic resin, for example, upon which is painted a translucent layer of white paint covered by an opaque layer of black paint. The black paint is removed by photographic or mechanical means so as to expose portions of the translucent white layer. Most frequently the exposed area is in the form of markings and numerals. A source of light illuminates the transparent resin body and light is transmitted through the translucent portion and is visible from the front wherever the opaque layer has been etched away. A source of illumination permits a beam of light to impinge on a movable indicator in all positions thereof.

Many attempts have been made to provide improved internally lighted instruments. In general these prior devices have had in common one or more undesirable characteristics.

In some types of indicators the numerals and indicia were subject to an optical phenomenon wherein they appeared to float in air. This effect is particularly noticeable since a red light is employed; the red portion of the spectrum being preferred because of its lesser effect on the night time visual sensitivity of the human eye. As will be more fully disclosed hereinafter, this invention has solved the problem. Further, the currently used indicator suffers from the disadvantage that the movable indicator is clearly visible only from vantage points substantially in front of the instrument and just barely visible from positions off to the side.

The conventional pointer currently used in indirectly lighted instruments presents a dark line at the center which effect is highly objectionable. This dark line arises from the structural configuration which provides for two intersecting angular faces, the line of intersection forming the black line. It should be appreciated that a viewer attempting to determine a reading is concentrating on the illuminated pointer, and the dark line occurs at precisely the point at which the reading is to be noted. This can, under flight conditions, be extremely annoying to the observer. On the other hand, the pointer of this invention presents a flat surface to the viewer which may be observed over a wide angle without presenting a dark line.

The present invention, therefore, contemplates a novel illuminated movable indicator for use in combination with illuminated instruments of the type described above which provides good visibility at all angles.

An object of this invention is to provide an improved indirectly lighted instrument.

A general object is to provide an easily read instrument.

It is an object of this invention to provide an indirectly illuminated indicator having the light source completely concealed from the view of the observer.

An object of the present invention is to provide improved pointers for indirectly lighted indicating instruments.

A particular object is to provide an indirectly illuminated pointer characterized by a uniform bright appearance free from dark lines.

A particular object is to provide an illuminated pointer visible from a wide observation angle.

It is an object of this invention to provide an indicator which minimizes parallax errors.

It is another object to provide an indirectly illuminated instrument which does not provide the illusion of "floating" indicia.

The above and still other objects and advantages of the present invention will appear more fully hereinafter from a consideration of the detailed description which follows, taken together with the accompanying drawings where one embodiment of the invention is illustrated.

Figure 1:
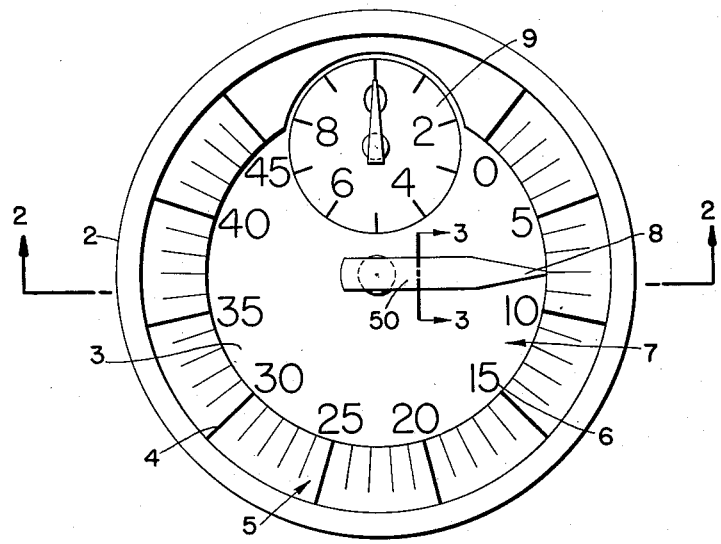
Figure 1 is a front elevational view of an illuminated instrument embodying the present invention.

Referring now to Figure 1, there is shown the face of a typical indicating instrument where may be seen the bezel window 3, indicia 4 carried by dial ring 5, numerals 6 carried by dial 7, pointer 8, and fractional sub-dial 9.

Figure 2:
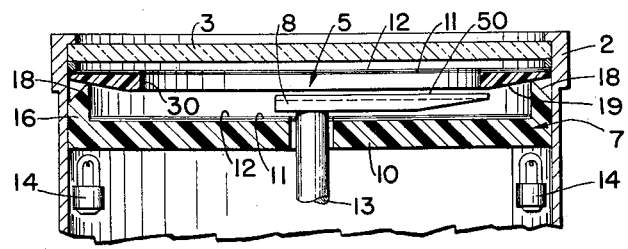
Figure 2 is a sectional side elevation of the illuminated instrument taken along line 2—2 in Figure 1.

In the cross sectional view of Figure 2 may be seen a portion of a case for the instrument which includes bezel portion 2, a glass window 3, dial ring 5, pointer 8 and dial body 7. Dial body 7 and ring 5 are composed of a body 10 formed of an acrylic resin or other transparent material having suitable light transmission properties. Coated upon the front surface of member 10 there is provided a duplex layer composed of a translucent coating 11 preferably of the vinyl base type and an opaque layer, preferably a flat black vinyl paint, 12. The opaque layer 12 is chemically or mechanically etched away to provide the indicia and numerals visible in Figure 1. In the etching process the translucent layer 11 is not disturbed. Illuminating lamps 14 transmit light through the transparent member 10 and translucent layer 11; the passage of light through the translucent layer 11 being visible as indicia and numerals wherever portions of layer 12 have been removed. Illumination is also transmitted from lamps 14 which usually have red envelopes, through transparent member 16 which preferably is a ring integrally molded with member 10 and having the same index of refraction. Members 10 and 16 may thus be seen to constitute a cup-shaped member having bevelled rim, or angular face 18. A preferred acrylic resin is a polymethyl methacrylate such as the grade sold under the designation, "Plexiglas II uva." The light rays are reflected by angular light reflecting surface 18 toward the center of the indicator.

Angular face 18 may be extended to a point from face 19 to a point even with the surface 12 in order to increase the amount of light transmitted to pointer 8.

Transparent pointer 8 may be formed from the same type methyl methacrylate polymer. The pointer 8 intercepts the light beam and is illuminated, as will be hereinafter discussed in greater detail. An auxiliary dial consisting of ring 5 is formed of methyl methacrylate and has applied thereto the duplex layer 11 and 12 of the translucent paint and the opaque paint layer respectively. Indicia 4 is engraved thereon by mechanical or photographic methods in the same manner as the numerals on the main dial 7. Sufficient light is directly transmitted through angular portion 18 to serve to illuminate auxiliary dial 5 and the indicia 4 engraved therein. There is provided an opaque masking portion 30 which may be a simple layer of opaque lacquer which prevents the viewer from seeing light from the inner edge of the cylinder formed by the ring 5.

Auxiliary dial 5 serves several functions including that of indicia bearing member, and as means to shield the viewer from light reflected from angular portion 18, and as means to generally illuminate dial face surface 12. It is this general illumination that eliminates the "floating figure" optical illusion. It will be noted that lower face 19 of member 5 is slanted so as to provide a greater measure of light shielding.

The body of ring member 5 need not be totally transparent but may be translucent.

Shaft 13 upon which pointer 8 is mounted may be connected to a motor or to other condition responsive members conventional in the art.

Figure 3:
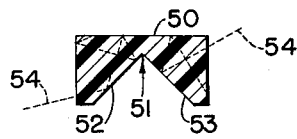
Figure 3 is an enlarged view of a partial section of the pointer taken along line 3—3.

In Figure 3 there is shown in enlarged cross section details of the pointer of this invention. It will be seen that the pointer is provided with a flat upper portion 50 and a groove 51 having a pair of angular faces 52 and 53. As light beams directed from angular member 18 pass through the body of pointer they strike the angular faces 52 and 53 and are reflected upwardly to surface 50 as may be seen by the dash lines 54. Repeated reflection of the beam between the upper surface 50 and the surfaces 52 and 53 occurs. This reflection serves to provide uniform illumination of the upper portion of the pointer.

While I have shown the groove as angular in cross section, it is to be understood that the specific shape is not critical and that a concave groove having a rounded configuration may likewise be employed.

The groove is preferably coated with a white paint so that better daytime visibility is obtained. It has been found that an epoxy resin base paint is best suited for the purpose as it forms an excellent bond with the epoxy base cements employed for bonding the pointer to the shaft hub (not shown). It is important that the paint employed not be a solvent for the pointer material, otherwise the essential smooth finish is destroyed. The surface must be smooth as discontinuities produce uneven illumination.

It is preferred that pointer 8 be of sufficient length so that the tip thereof disappears under auxiliary dial ring 5. This feature of the invention minimizes the effect of parallax. It has been found that the use of an auxiliary dial interposed between the edge of the pointer and the viewer provides for a more accurate and visible reading than the conventional style wherein the indicia is on a dial wherein the pointer is interposed between the indicia and the viewer.

While I have made reference to coated transparent bases, it should be understood that laminates of transparent, translucent and opaque materials may be employed.

Having thus disclosed the best embodiment of my invention currently contemplated, it is to be understood that variations and modifications may be made by those skilled in the art without departing from the spirit of the invention.

What is claimed is:

1. An indicator for use in combination with a source of illumination comprising a light transmitting cup-shaped member having a cylindrical wall portion and a beveled rim portion, a light transmitting annular member positioned adjacent to and inwardly of said beveled rim portion and adapted to receive light transmitted from said source of illumination through said cylindrical wall portion and said beveled rim portion, said annular member and the interior of said cup-shaped member comprising dial faces having opaque upper surfaces, adapted to receive a plurality of markings extending through said opaque surfaces, and a movable indicator pointer positioned within said cup-shaped member and having a portion extending under said annular member.

2. An indicator for use in combination with a source of illumination comprising a light transmitting cup-shaped member having a cylindrical wall portion and a beveled rim, a light transmitting annular member positioned adjacent to and inwardly of said beveled rim portion and adapted to receive light transmitted from said source of illumination through said cylindrical wall portion and said beveled rim portion, said annular member and the interior of said cup-shaped member comprising dial faces having opaque upper surfaces adapted to receive a plurality of markings extending through said opaque surfaces, and a movable indicator pointer positioned within said cup-shaped member and having a portion extending under said annular member, said indicator pointer comprising an elongated light transmitting member having a normally viewed upper surface, a lower surface and a pair of side walls, and a light reflecting means forming an integral part of said member, said light reflecting means being arranged to reflect light passing transversely through said side walls upwardly through said member to said upper surface.

3. An indicator for use in combination with a source of illumination comprising a light transmitting cup-shaped member having a cylindrical wall portion and a beveled rim portion, a light transmitting annular member positioned adjacent to and inwardly of said beveled rim portion and adapted to receive light transmitted from said source of illumination through said cylindrical portion, said annular member characterized by a thicker portion at the inner diameter than at the outer diameter thereof, said annular member and the interior of said cup-shaped member having opaque upper surfaces, adapted to receive a plurality of markings extending through said opaque surfaces, and a movable indicator pointer positioned within said cup-shaped member and having a portion extending under said annular member.

4. An indicator for use in combination with a source of illumination comprising a light transmitting cup-shaped member having a cylindrical wall portion and a beveled rim portion, a light transmitting annular member positioned adjacent to and inwardly of said beveled rim portion and adapted to receive light transmitted from said source of illumination through said cylindrical wall portion and said beveled rim portion, said annular member characterized by a thicker portion at the inner diameter than at the outer diameter, said annular member and the interior of said cup-shaped member comprising dial faces having opaque upper surfaces adapted to receive a plurality of markings extending through said opaque surfaces, and a movable indicator pointer positioned within said cup-shaped member and having a portion extending under said annular member, said indicator pointer comprising an elongated light transmitting member having a normally viewed upper surface, a lower surface and a pair of side walls, and a light reflecting means forming an integral part of said member, said light reflecting means being arranged to reflect light passing transversely through said side walls upwardly through said member to said upper surface.

5. An indicator for use in combination with a source of illumination comprising a light transmitting cup-shaped member, including a cylindrical portion, and a light transmitting annular member positioned adjacent said cylindrical portion and adapted to receive light transmitted from said source of illumination through said cylindrical portion, said annular member and the interior of said cup-shaped member comprising dial faces having opaque upper surfaces, a plurality of translucent indicia carried by said annular member, and a movable indicator pointer positioned within said cup-shaped member and having a portion extending under said annular member.

6. An indicator pointer adapted to be illuminated by an external source of light comprising an elongated light transmitting member having a normally viewed upper surface, a lower surface and a pair of side walls, and a light reflecting means forming an integral part of said member, said light reflecting means being arranged to reflect light passing transversely through said side walls upwardly through said member to said upper surface.

7. An indicator pointer adapted to be illuminated by an external source of light comprising an elongated light transmitting member having a normally viewed upper surface, a lower surface and a pair of side walls, and a light reflecting means forming an integral part of said member, said light reflecting means being arranged to reflect light passing transversely through said side walls upwardly through said member to said upper surface, wherein said light reflecting means is a portion of said lower surface of said member defined by a longitudinally substantially V shaped groove extending into said member.

8. The pointer of claim 7 wherein said portion of said lower surface defined by the groove is non-transparent.

References Cited in the file of this patent

UNITED STATES PATENTS

| | | |
|---|---|---|
| 2,272,806 | Klein et al. | Feb. 10, 1942 |
| 2,278,520 | Klein et al. | Apr. 7, 1942 |
| 2,280,700 | Hall | Apr. 21, 1942 |
| 2,637,296 | Colt | May 5, 1953 |